United States Patent [19]

Pollak et al.

[11] Patent Number: 4,572,848

[45] Date of Patent: Feb. 25, 1986

[54] PROCESS FOR THE PRODUCTION OF MOLDED BODIES FROM SILICON-INFILTRATED, REACTION-BONDED SILICON CARBIDE

[75] Inventors: Werner Pollak, Selb/Bayern, Fed. Rep. of Germany; Michael Blecha, Stoob, Austria; Gerhard Specht, Selb/Bayern, Fed. Rep. of Germany

[73] Assignee: Hoechst CeramTec Aktiengesellschaft, Selb/Bayern, Fed. Rep. of Germany

[21] Appl. No.: 635,201

[22] Filed: Jul. 27, 1984

[30] Foreign Application Priority Data

Jul. 29, 1983 [EP] European Pat. Off. ........ 83107469.5

[51] Int. Cl.⁴ ............................................. B05D 3/00
[52] U.S. Cl. ................................... 427/294; 118/271; 427/398.4; 427/429
[58] Field of Search ...................... 427/294, 429, 430.1, 427/374.6, 255, 202, 204, 399, 397.7, 398.4; 118/271; 428/448, 408, 704, 688

[56] References Cited

U.S. PATENT DOCUMENTS

| | | | |
|---|---|---|---|
| 3,035,325 | 5/1962 | Nicholson et al. | 427/255 |
| 3,495,939 | 2/1970 | Forrest | 106/43 |
| 4,120,731 | 10/1978 | Hillig et al. | 106/44 |
| 4,148,894 | 4/1979 | Hillig et al. | 428/242 |
| 4,154,787 | 5/1979 | Brown | 264/60 |
| 4,230,745 | 10/1980 | Betz et al. | 427/255 |

FOREIGN PATENT DOCUMENTS

| | | |
|---|---|---|
| 0064606 | 11/1982 | European Pat. Off. . |
| 2644503 | 4/1977 | Fed. Rep. of Germany . |
| 2707299 | 9/1977 | Fed. Rep. of Germany ........ 106/44 |
| 2910628 | 1/1980 | Fed. Rep. of Germany ........ 264/60 |
| 1509497 | 5/1978 | United Kingdom .................. 264/60 |
| 2002734 | 2/1979 | United Kingdom ................ 427/294 |
| 2062600 | 5/1981 | United Kingdom . |

Primary Examiner—S. L. Childs
Attorney, Agent, or Firm—Schwartz, Jeffery, Schwaab, Mack, Blumenthal & Evans

[57] ABSTRACT

Silicon-infiltrated, reaction-bonded silicon carbide molded bodies for application in machine building are produced by means of a siliconizing apparatus, comprising a graphite plate coated with boron nitride, a porous silicon carbide plate coated with a layer of boron nitride, silicon carbide and carbon and a layer of lumpy metallic silicon inserted between the two plates. Furthermore, following the heating and solidification of the liquid silicon, wherein due to the increase in volume of the silicon, beads of silicon appear at the surface of the molded body, these may be easily removed when the infiltrated silicon carbide molded bodies are cooled in a nitrogen atmosphere.

11 Claims, 2 Drawing Figures

PROCESS FOR THE PRODUCTION OF MOLDED BODIES FROM SILICON-INFILTRATED, REACTION-BONDED SILICON CARBIDE

BACKGROUND OF THE INVENTION

The present invention relates to a process for the production of molded bodies from silicon-infiltrated, reaction-bonded silicon carbide (SiSiC) for applications in machine building, in particular in the building of sliding rings and heat exchangers. The porous molded bodies comprise a mixture of silicon carbide and carbon and are heated in a vacuum in the presence of silicon to temperatures in excess of 1410° C., above the melting temperature elemental silicon, with a holding time of from about 0.5 to 6 hours.

German Offenlegungsschrift No. 29 10 628 discloses the infiltration of porous molded bodies of a silicon-carbon mixture, with the use of silicon-containing feeders. These feeders are prepared from a mixture of carbon and silicon, wherein silicon forms, upon heating with the carbon, a skeleton of newly formed silicon carbide, and the molten silicon, which is supplied in excess, is introduced into the molded body to be infiltrated. The SiC matrix of the feeders, which as a result is porous, is readily removed after firing. It is desirable in the process to place the silicon carbide-carbon pressed part at the bottom and the silicon-carbon pressed part on top as the feeder, since this type of arrangement favors the flow of the molten silicon into the silicon carbide-carbon body, together with its penetration as a result of the capillary effect and of gravity. The disadvantage of this method resides in the fact that a mass of silicon and carbon must be specially prepared and pressed into a feeder, which cannot be reused. A variant of the preparation of the feeder employs the mixture of silicon and carbon for the siliconizing process in a loose power form. The amount desired is poured into and around the silicon carbide-carbon pressed shape. In both of these methods, fine grained silicon and carbon are mixed with each other. It has been found detrimental that impurities are introduced with the very fine silicon, having an average grain size of 75 $\mu$m, which later may lead to defects, especially cracks in the finished, siliconized molded body.

In order to improve the impact strength of SiSiC molded bodies, 10 to 55% of boron nitride is added according to German Offenlegungsschrift No. 27 07 299 to the molded body formed of a mixture of silicon carbide and carbon. The boron nitride essentially does not react with the molten silicon. Siliconizing is effected by placing the molded body into a mold together with silicon which later is melted. The infiltration of the molten silicon is effected at temperatures in excess of 1410° C. by means of wicks which are comprised of carbon fibers. Boron nitride may be used, for example, as the mold release agent. A disadvantage of the process is the very expensive preparation of the graphite mold and of the wick material, which renders it uneconomical for the mass production of molded bodies.

A further difficulty in siliconizing is encountered in German Offenlegungsschrift No. 26 44 503, because the commercially available silicon carbide powder always contains some silicon dioxide. This silicon dioxide is not wetted by the molten silicon metal so that siliconizing in the case of objects with a material of this type is always difficult. In this process the porous object is heated in the absence of oxygen to the siliconizing temperature above the melting temperature of silicon. The object is then maintained in a gaseous environment containing essentially nitrogen with from 0 to 10%, preferably 3 to 7% hydrogen contained therein. In this binary gas treatment nitrogen and hydrogen react with all of the oxides of silicon present in silicon carbide and convert them to silicon nitride. The nitrogen also reacts with clean silicon surfaces to form silicon nitride. The dual gas treatment thus effects a purification of the object by removing the silicon oxides, and also insures the availability of an adequate pore volume within the molded body, sine the carbon in the silicon carbide is converted in a manner so that the porous structure of the object is not prematurely sealed. This nitrogen containing environment is removed when the siliconizing temperature is attained so that silicon metal flows into the molded body over the porous skeleton and rapidly penetrates the available carbon and the graphite present in the object. If a nitrogen environment is present in the firing chamber, the nitrogen reacts with the liquid silicon metal to form a silicon nitride skin over it, which prevents any penetration of the porous molded body by the silicon.

Basically, all of the processes known from the literature for preparing infiltrated silicon carbide have the disadvantage that, upon solidification, silicon exudes from the molded body and wets its surface over large areas, which frequently leads to adhesion with the auxiliary firing agents. As a consequence, upon the separation of the molded bodies from the firing support the part is damaged. Furthermore, the often substantial mechanical or chemical cleaning effort required for the surfaces covered with silicon is highly uneconomical.

SUMMARY OF THE INVENTION

It is therefor an object of the present invention to provide an apparatus for use in a siliconizing process whereby after firing the silicon carbide body infiltrated with silicon may be easily released from the firing support without damage to either and a uniform distribution of the molten silicon in the molded body is effected.

Another object of the present invention is to provide an apparatus as above which is reusable.

Still another object of the present invention is to provide a process for the siliconization of porous molded silicon carbide bodies which produces finished siliconized bodies which are free from cracks and other defects caused by impurities.

Yet another object is to provide a process as above wherein beads of silicon which form on the surface of the molded body as a result of the cooling step adhere only weakly to the surface.

Still another object is to provide a process as above which is economically and otherwise suitable for the mass production of molded bodies.

In accomplishing the foregoing objects, there has been provided in accordance with one aspect of the present invention an apparatus for the siliconization of porous molded silicon carbide bodies, comprising a base plate and a support plate, wherein the base plate comprises a graphite plate coated with boron nitride, and the support plate comprises a silicon-impregnated, porous silicon carbide support with a layer comprising carbon, boron nitride, and silicon carbide applied thereto. The support plate is stacked on top of the base plate, and a layer comprising metallic silicon is placed between the two plates.

In accordance with another aspect of the present invention there has been provided a process for the siliconization of porous molded silicon carbide bodies comprising the steps of placing the molded body onto an apparatus comprising a support and base plate as defined above, with a layer comprising silicon placed between said plates. The molded body and apparatus are then heated under vacuum to a temperature above the melting point of elemental silicon for a period of from about 0.5 to 6 hours, and finally cooled in a nitrogen atmosphere under a pressure of from about 0.05 to 1 bar.

Further objects, features and advantages of the present invention will become apparent from the detailed description of preferred embodiments which follows, when considered together with the attached figures of drawing.

BRIEF DESCRIPTION OF THE DRAWINGS

The invention will be described in further detail with reference to the accompanying drawings wherein.

DETAILED DESCRIPTION OF PREFERRED EMBODIMENTS

In an apparatus to carry out a process for the preparation of molded bodies from reaction-bonded silicon carbide infitrated by silicon, the present invention provides for placing the molded body onto an assembly comprising a graphite plate coated with boron nitride, a porous silicon carbide plate infiltrated by silicon and coated with a mixture of boron nitride, silicon carbide and carbon, and a layer between these two plates of metallic silicon in lump form. In order to insure an easy removal of the excess adherent silicon from the finished, siliconized body, a means for controlling the atmosphere is provided, whereby following the holding time, the silicon carbide bodies infiltrated with silicon are cooled in a nitrogen atmosphere at pressures of from about 0.05 to 1 bar.

Figure 1:
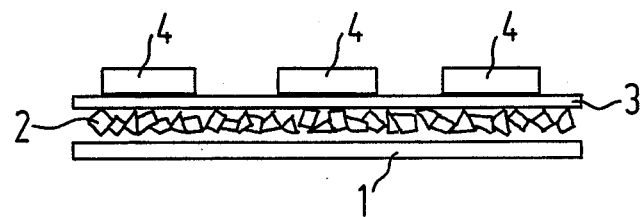
FIG. 1 is a schematic cross-sectional view of an arrangement for carrying out the process of the invention.

FIG. 1 shows an arrangement for siliconizing porous molded bodies of silicon carbide. The arrangement comprises a graphite base plate 1 which is insulated or coated with a layer of boron nitride. An intermediate layer of particulate metallic silicon 2 having a particle size of from about 3 to 10 millimeters is strewn over the base plate. A support plate 3 of silicon carbide covered by a separating layer is placed over the metallic silicon particles. The molded bodies 4 to be siliconized are disposed on support plate 3.

Figure 2:
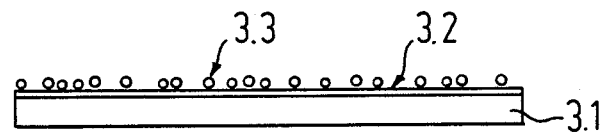
FIG. 2 is a schematic cross-sectional view of a support plate used in the arrangement of FIG. 1.

FIG. 2 depicts the support plate 3 in somewhat greater detail. The support plate comprises a plate 3.1 of porous silicon carbide which has been subsequently infiltrated by silicon metal. The silicon infiltrated plate 3.1 is covered with a separating coating layer 3.2 comprising a mixture of carbon, boron nitride and silicon carbide in desired proportions. On top of the coating 3.2, a thin layer of a granular or particulate mixture 3.3 of silicon carbide and carbon is strewn or scattered having a particle size of from about 0.5 to 1 millimeters.

The aforedescribed arrangement is heated to a temperature from about 1500° to 1800° C. in a vacuum and held at maximum temperature for a period from about 0.5 to 6 hours. Nitrogen is introduced into the furnace until a pressure from about 0.05 to 1 bar is achieved. The oven with the siliconized molded bodies is then allowed to cool while the nitrogen atmosphere is maintained.

The described process has the advantages that the siliconized molded bodies are easily separated from the support plate because of the boron nitride-containing separating paste and by means of the scattered particles which hold the molded bodies in spaced relation to the support plate, that the molded bodies do not sink into the support since the support plate is rigid, that the parts are easily cleaned since silicon which sweats out of the bodies adhere only weakly because of the nitride skin which forms, and that the silicon is well distributed by means of the porous support plate.

The layer of boron nitride on the base plate prevents the wetting and possible conversion of the graphite plate by the molten silicon. The support plate receives the molten silicon and guides it to the porous body to be siliconized. In this way, the layer composed of boron nitride, carbon and silicon carbide has a regulating effect on the flow of silicon.

The cooling of molded bodies infiltrated with silicon in a nitrogen-containing atmosphere has the effect that, even though, as the result of the increase in volume of the solidifying silicon, some silicon will exude from the body, the nitride skin being formed prevents the exuded silicon from wetting the surface of the molded body over large areas. Consequently, the silicon exudates formed in the process according to the invention are easily removed from the bodies after the removal of the bodies from the oven. There is therefore less chipping of the body during the cleaning of the surface whereby rejection rates are reduced and the process is made more economical with respect to the known methods. Furthermore, by the use of coarsely grained metallic silicon, the introduction of excessive amounts of impurities on the surface of the silicon is avoided in the process. In particular, an improved siliconizing process results from this type of addition of silicon and also from the specific control of the atmosphere with nitrogen.

A coating comprising 2 parts by weight of carbon, 3 parts by weight of boron nitride and 5 parts by weight of silicon carbide has been found to be particularly advantageous. The granular bodies scattered over the surface further provide a point shaped support and facilitate, together with the coating, the release of the infiltrated molded bodies from the support plate.

Another possible mode for the preparation of the support plate consists of the casting or pressing of a mixture of silicon and silicon carbide, wherein carbon must be present.

Further details and advantageous additional developments of the process according to the invention and of the apparatus for the siliconizing of porous molded bodies will become apparent from the non-limiting example below, in particular for the production of sliding rings.

EXAMPLE

A molded body for a sliding ring is prepared by mixing 84% by weight of hexagonal silicon carbide of conventional grinding medium quality having an average grain size of 9 $\mu$m and 8% by weight of graphite with a grain size of approximately 3 $\mu$m, and 9% by weight of a phenol resin with a coking residue of 50%, with the phenol resin being dissolved in alcohol in a proportion of 1:3. The solvent is removed from this highly viscous paste by vacuum evaporation, and granules of 0 to 0.06 mm are prepared by the screening of the dry mixture. The granules are pressed under a pressure of about 2000 bar into a ring having a diameter of 80 mm and a height of 10 mm. The weight of the ring is around 98 g and the pressed density of the blank is 2 g/cm$^3$. Following coking at 1000° C. and a holding time of 5 hours, the pressed shape comprises about 13% by weight pure carbon and 87% by weight silicon carbide, with the remaining components of the phenol resin maintaining the silicon body together. The density in the coked state is 1.97 g/cm$^3$.

The process according to the invention for siliconizing the molded body is as follows: a base plate of a commercially available fine grained graphite is coated with a suspension of boron nitride powder in water and dried. A porous support plate of silicon carbide is impregnated with silicon in a separate batch and furnace cooled. Following its removal from the furnace, the support surface is cleaned, smoothed, coated with a suspension in alcohol of 2 parts by weight carbon, 3 parts by weight boron nitride and 5 parts by weight silicon carbide and dried. Granules with a grain size of 0.5 to 1 mm of a mixture of silicon carbide and carbon are scattered onto the coating. For the infiltration process, lumpy silicon metal with a grain size of 3 to 10 mm is placed, in the amount necessary for the complete infiltration of the molded body, onto the coated graphite plate, covered with the coated and impregnated silicon carbide plate and the coked molded bodies are laid thereon. By heating at a rate of approximately 300° C./h to 1600° C. in a 1 Torr vacuum, the molded bodies are uniformly infiltrated by the silicon, and the carbon present is converted to SiC. After a holding period of 6 hours the vacuum pump is deactivated, and nitrogen is introduced into the furnace chamber to a pressure of 0.05 to 1 bar. This process produces a molded body with a density of more than 3.10 g/cm$^3$, which as the result of the special process consists of 84% by weight silicon carbide with a maximum grain size of 13 μm and 16% by weight silicon, with the latter filling the voids between the silicon carbide crystals.

Ground and polished specimens show no carbon residues and no pores at a magnification of 800x. Bending strength, measured with a 40/20 mm, four point support arrangement, was determined on specimen rods of 4.5×3.5×50 mm cut from the plate to be 400N/mm$^2$.

Upon cooling in the presence of nitrogen, beads of silicon form on the surface of the molded body as the result of the nitride skin produced; these are easily removed by mechanical finishing. Furthermore, by means of the boron nitride content of the coating on the plate, mechanical damage is avoided, since the molded body no longer adheres so tightly to the firing support.

Further advantages of the process according to the invention are that the preparation of silicon feeders is eliminated, and thus the utilization of furnace capacity is improved. Because in this process fewer exudates of silicon appear on the surface and no feeder residues are located on the molded body, shorter sand blasting times and a reduced grinding effort on the sliding ring are required. In addition to the further savings of silicon raw material, a clean furnace atmosphere is attained, since fewer resins and solvents are introduced into the furnace, thereby extending the useful life of the vacuum pump as another advantage.

What is claimed is:

1. A process for the siliconizing of porous molded silicon carbide bodies, comprising the steps of:
    (a) placing a molded silicon carbide body which contains elemental carbon onto an apparatus comprising a base plate comprising a graphite plate coated with boron nitride and a support plate, comprising a porous plate comprising silicon carbide which is infiltrated with silicon, and a coating which comprises a mixture of boron nitride, silicon carbide and carbon, and a layer comprising silicon therebetween;
    (b) heating the molded silicon carbide body and support and base plates under vacuum to a temperature higher than the melting point of elemental silicon, for a holding time of from about 0.5 to 6 hours, thereby infiltrating the silicon carbide molded body with silicon; and
    (c) thereafter cooling the molded body in a nitrogen atmosphere under a pressure of from about 0.05 to 1 bar.

2. A process according to claim 1, wherein the support plate comprises an originally porous silicon carbide plate into which metallic silicon has been infiltrated and the coating comprises a mixture of about 2 parts by weight carbon, about 3 parts by weight boron nitride and about 5 parts by weight silicon carbide, and further comprising a mixture of silicon carbide and carbon granules scattered thereon.

3. A process according to claim 1, wherein the support plate is made by molding a mixture of silicon and silicon carbide in the presence of carbon.

4. A process according to claim 1, wherein the layer between said support and base plates comprises lumpy metallic silicon, or granules comprising silicon carbide and carbon.

5. A process according to claim 1, wherein the porous molded body comprises a mixture of silicon carbide and carbon.

6. A process according to claim 1, wherein the heating step comprises heating the molded body to a temperature in excess of about 1410° C.

7. A process according to claim 2, wherein said base plate is produced by coating a fine grained graphite plate with a suspension of boron nitride powder in water, and then drying said coated plate.

8. A process according to claim 1, wherein said support plate is produced by the steps of:
    (a) impregnating a porous support plate of silicon carbide with silicon;
    (b) furnace cooling the impregnated plate;
    (c) cleaning and smoothing the plate;
    (d) coating the plate with a suspension in alcohol comprising about 2 parts by weight carbon, about 3 parts by weight boron nitride, and about 5 parts by weight silicon carbide;
    (e) drying the plate; and
    (f) scattering granules of a mixture of silicon carbide and carbon having a grain size of from about 0.5 to 1 mm onto the coating.

9. A process according to claim 4, wherein the lumpy silicon metal has a grain size of from about 3 to 10 mm.

10. A process according to claim 1, wherein the molded body is heated at a rate of about 300° C./h to about 1600° C. under a vacuum of about 1 Torr.

11. An apparatus for the siliconization of porous molded silicon carbide bodies, comprising a base plate and a support plate, wherein the base plate comprises a graphite plate coated with boron nitride, and the support plate comprises a silicon-impregnated, porous silicon carbide support with a layer comprising carbon, boron nitride, and silicon carbide applied thereto wherein the support plate is stacked on top of the base plate, and a layer comprising metallic silicon is placed between the two plates.

* * * * *